(12) United States Patent
Challagolla et al.

(10) Patent No.: US 10,474,381 B2
(45) Date of Patent: Nov. 12, 2019

(54) MULTI-SERVER SYSTEM RESOURCE MANAGER

(71) Applicant: The Travelers Indemnity Company, Hartford, CT (US)

(72) Inventors: Venu Challagolla, Avon, CT (US); Mohan V. Chalasani, Hartford, CT (US); Mark R. Finn, Bristol, CT (US); Srivalli Chitturi, Cedar Park, TX (US); Sreekanth Palagiri, Manchester, CT (US)

(73) Assignee: THE TRAVELERS INDEMNITY COMPANY, Hartford, CT (US)

( * ) Notice: Subject to any disclaimer, the term of this patent is extended or adjusted under 35 U.S.C. 154(b) by 208 days.

(21) Appl. No.: 15/472,511

(22) Filed: Mar. 29, 2017

(65) Prior Publication Data
US 2018/0285008 A1 Oct. 4, 2018

(51) Int. Cl.
*G06F 12/00* (2006.01)
*G06F 3/06* (2006.01)

(52) U.S. Cl.
CPC ............ *G06F 3/0631* (2013.01); *G06F 3/061* (2013.01); *G06F 3/0605* (2013.01); *G06F 3/067* (2013.01); *G06F 3/0643* (2013.01)

(58) Field of Classification Search
CPC ...... G06F 3/0631; G06F 3/0643; G06F 3/067; G06F 3/0605; G06F 3/061
See application file for complete search history.

(56) References Cited

U.S. PATENT DOCUMENTS

| 9,274,849 B1 * | 3/2016 | Estes ..................... G06F 9/5072 |
| 2005/0154576 A1 * | 7/2005 | Tarui ................... H04L 41/0853 703/22 |
| 2006/0294148 A1 * | 12/2006 | Brunet .................... H04L 43/00 |

* cited by examiner

*Primary Examiner* — Kalpit Parikh
(74) *Attorney, Agent, or Firm* — Cantor Colburn LLP

(57) ABSTRACT

A system includes a network interface, a processing device, and a memory device. The memory device stores instructions for accessing a first log file of a first format type from a first server and converting the first log file to a first record in a shared data-interchange format. A second log file of a second format type is accessed from a second server. The second log file is converted to a second record in the shared data-interchange format, and instances of the first and second record are collected over a period of time. A resource allocation of the first server and the second server is analyzed based on the instances of the first record and the second record. A resource allocation adjustment request is transmitted to one or more of the server systems based on a predicted trend of the resource allocation of the first and second server.

23 Claims, 13 Drawing Sheets

700 — User Memory (100)

| User 1 | 47.942 - (0%) |
| User 2 | 78.895 - (0%) |
| ... | ... |
| User N | 79.659 - (0%) |

FIG. 7

800 — User CPU (100)

| User 1 | 38.658 - (0%) |
| User 2 | 74.728 - (0%) |
| ... | ... |
| User N | 72.850 - (0%) |

FIG. 8

```
1300
{
    {
        "_id" : ObjectId("57251dbe598792379df4749"),
        "server_name" : "tfabbdu2",
        "index" : 0,
        "date" : "2016-04-06",
        "time" : "23:10",
        "os" : "RHEL6",
        "procs" : 151.4,
1302    "cswch" : 11700.32,
        "cpu" : "all",
        "%user" : 6.52,
        "%nice" : 7.88,
        "%system" : 5.21,
        "%iowait" : 3.25,
        "%steal" : 8.24,
        "%irq" : 5,
        "%soft" : 4.39,
        "%guest" : 3.15,
        "%idle" : 53.19,
        "pgpgin/s" : 31021.64,
        "pgpgout/s" : 23026.89,
        "fault/s" : 12542.29,
        "majflt/s" : 9.58,
1304    "pgfree/s" : 228413.37,
        "pgscank/s" : 5697.22,
        "pgscand/s" : 64.99,
        "pgsteal/s" : 32078.07,
        "%vmeff" : 22.15,
        "tps" : 95599.33,
        "rtps" : 3020.14,
1306    "wtps" : 1578.67,
        "bread/s" : 562846.25,
        "bwrtn/s" : 333607.66
}
```

{
    1402 {
      "_id" : ObjectId("57252249e598792379df47ad"),
      "server_name" : "tfabbdu1",
      "index" : 0,
      "date" : "2016-04-22",
      "time" : "03:10",
      "os" : "RHEL5",
      "procs" : 281.8,
      "cswch" : 33240.19,
      "cpu" : "all",
      "%user" : 2.26,
      "%nice" : 2.97,
      "%system" : 4.91,
      "%iowait" : 4.63,
      "%steal" : 7.56,
      "%idle" : 95.28, 1404 {
      "intr/s" : 33980.62,
      "pswpin/s" : 6.95,
      "pswpout/s" : 7, 1406 {
      "tps" : 73842.62,
      "rtps" : 4569.36,
      "wtps" : 1557.51,
      "bread/s" : 436683.51,
      "bwrtn/s" : 687378.87
}

FIG. 14

MULTI-SERVER SYSTEM RESOURCE MANAGER

BACKGROUND

In a multi-server computer network system, a variety of platforms can be networked together making a diverse set of data sources and application programs available to multiple users. The memory and processing resource needs of software developers versus non-developers can vary within a multi-server computer network system and may change over time. Further, the resource needs of users can change depending on whether a particular user switches between a developer role and a non-developer role on a particular system or systems. Server systems may have localized resource management tools that are effective at tracking activity specific to a particular vendor platform. However, variations in formatting conventions, protocols, and execution environments between various vendors can make it difficult to understand wide-scale resource allocation issues spread across multiple server systems using vendor tools that may not be directly compatible with each other.

BRIEF DESCRIPTION OF THE DRAWINGS

The subject matter which is regarded as the invention is particularly pointed out and distinctly claimed in the claims at the conclusion of the specification. The features and advantages of the invention are apparent from the following detailed description taken in conjunction with the accompanying drawings in which:

FIG. 7 depicts a user-level memory resource usage summary according to some embodiments of the present invention;

FIG. 8 depicts a user-level processor resource usage summary according to some embodiments of the present invention;

FIG. 13 depicts an example of extracted log file data in a first format according to some embodiments of the present invention; and FIG. 14 depicts an example of extracted log file data in a second format according to some embodiments of the present invention.

DETAILED DESCRIPTION

According to an embodiment, a system for resource management across multiple servers is provided. The system can access data, such as log files, stored across servers using different formatting and record types. The system enables monitoring and reporting of resource allocation and utilization of a wide-scale user footprint across networked resources rather than a limited platform-by-platform localized analysis. Log file data stored in different formats can be collected and converted into a shared data-interchange format. Resource allocation of multiple servers over a period of time can be analyzed to determine whether a resource allocation adjustment is needed based on observed conditions and one or more predicted trends. Resource allocation and adjustment can be managed on a per user type basis (e.g., user role as a developer or non-developer). Accordingly, the system may be used for resource management in a computer network system that solves multiple network-centric problems that are necessarily rooted in computer technology and specifically arise in the realm of computer networks.

Figure 1:
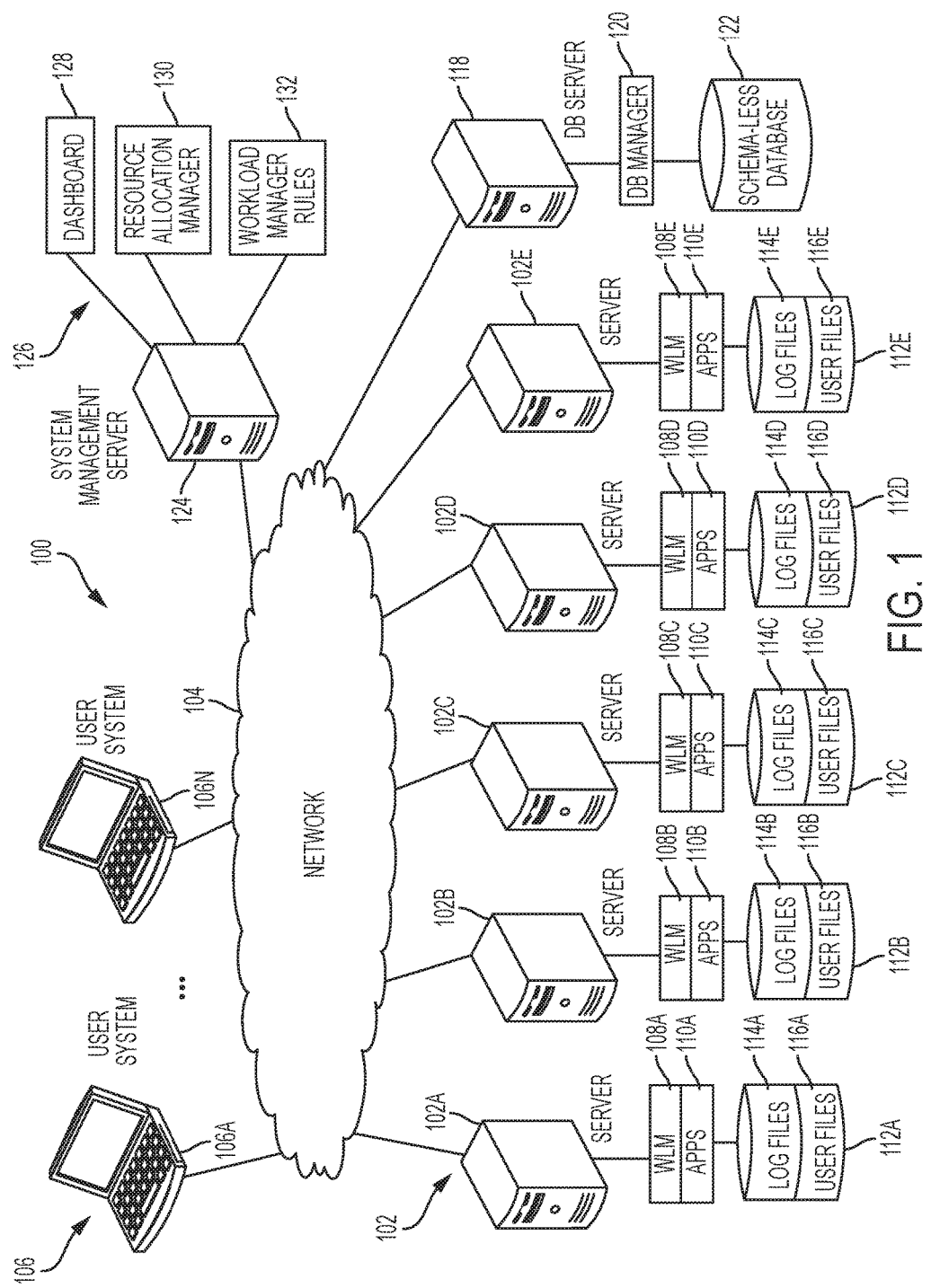
FIG. 1 depicts a block diagram of a system according to some embodiments of the present invention.

Turning now to FIG. 1, a system 100 is depicted upon which multi-server resource management may be implemented. The system 100 includes a plurality of server systems 102 coupled to network 104. A plurality of user systems 106 can access content served by the server systems 102 through the network 104. In the example of FIG. 1, the server systems 102 include a first server 102A, a second server 102B, a third server 102C, a fourth server 102D, and a fifth server 102E; however, any number of two or more server systems 102 can be included in embodiments. Each of the server systems 102 can include a corresponding workload manager (108A, 108B, 108C, 108D, 108E), applications (110A, 110B, 110C, 110D, 110E), and data storage systems (112A, 112B, 112C, 112D, 112E) operable to store log files (114A, 114B, 114C, 114D, 114E), user files (116A, 116B, 116C, 116D, 116E), and/or other data (not depicted). The log files 114A-114E can have different file and record formats depending on the tools used to generate the log files 114A-114E. For example, log files 114A may be Teradata™ logs, log files 114B may be Ab Inito™ logs, log files 114C may be Oracle™ logs, log files 114D may be Java™ logs, and log files 114E may be structured query language (SQL) logs. Thus, the log files 114A-114E can have different format types that may not be directly compatible with each other. Further, the log files 114A-114E can be associated with different versions of the same underlying system type. For instance, log files 114D and 114E can be associated with different versions of a same operating system, and thus have formatting variations due to version differences. Although five servers 102A-102E and five log files 114A-114E are depicted in the example of FIG. 1, it will be understood that there can be any number of server systems 102 and log files 114. There need not be a one-to-one relationship between server systems 102 and log files 114, e.g., a single server system 102 can include any number of log files 114. For instance, the log files 114 can capture system level activity and/or individual user level activity in different log files 114 in the same server system 102.

The system 100 can also include a database server 118 with a database manager 120 operable to store and retrieve data from a schema-less database 122. The schema-less database 122 may be a MongoDB database that stores JavaScript Object Notation (JSON) records/documents converted from application-specific data objects, for example. In embodiments, data values extracted from log files 114A-114E are converted to records in a shared data-interchange format compatible for storage/retrieval from the schema-less database 122.

A system management server 124 can access the schemaless database 122 through the database manager 120 to analyze resource allocation records stored therein. The system management server 124 can include a plurality of applications 126 to monitor resource allocation, trigger alerts, and determine resource allocation adjustment requests for the workload managers 108A-108E. For example, the applications 126 can include a dashboard 128 operable to interactively display resource allocation spread across servers 102A-102E with tracking on a per user basis of allocated-versus-used processing and memory resources, as well as other metrics. The applications 126 can also include a resource allocation manager 130 that may determine predicted trends of resource allocation and determine resource allocation adjustments based on workload manager rules 132 as further described herein. The database server 118 and the system management server 124 can be separate servers coupled to the network 104. Further, the database server 118 and the system management server 124 can be combined with each other or with one or more of the servers 102A-102E.

In the example of FIG. 1, each of the server systems 102, user systems 106, database server 118, and system management server 124 can include a processor (e.g., a processing device, such as one or more microprocessors, one or more microcontrollers, one or more digital signal processors) that receives instructions (e.g., from memory or like device), executes those instructions, and performs one or more processes defined by those instructions. Instructions may be embodied, for example, in one or more computer programs and/or one or more scripts. In one example, the system 100 executes computer instructions for implementing the exemplary processes described herein. Instructions that implement various process steps can be executed by different elements of the system 100, such as elements of the server systems 102, database server 118, and/or system management server 124.

The user systems 106 may each be implemented using a computer executing one or more computer programs for carrying out processes described herein. In one embodiment, the user systems 106 may each be a personal computer (e.g., a laptop, desktop, etc.), a network server-attached terminal (e.g., a thin client operating within a network), or a portable device (e.g., a tablet computer, personal digital assistant, smart phone, etc.). In an embodiment, the user systems 106 are operated by users having the role of a software developer or a non-developer with respect to particular applications 110A-110E, and the role designations may change over time.

Each of the server systems 102, user systems 106, database server 118, and system management server 124 can include a local data storage device, such as a memory device. A memory device, also referred to herein as "computer-readable memory" (e.g., non-transitory memory devices as opposed to transmission devices or media), may generally store program instructions, code, and/or modules that, when executed by a processing device, cause a particular machine to function in accordance with one or more embodiments described herein.

The network 104 can include any type of computer communication technology within the system 100 and can extend beyond the system 100 as depicted. Examples include a wide area network (WAN), a local area network (LAN), a global network (e.g., Internet), a virtual private network (VPN), and an intranet. Communication within the network 104 may be implemented using a wired network, an optical network, a wireless network and/or any kind of physical network implementation known in the art.

Figure 2:
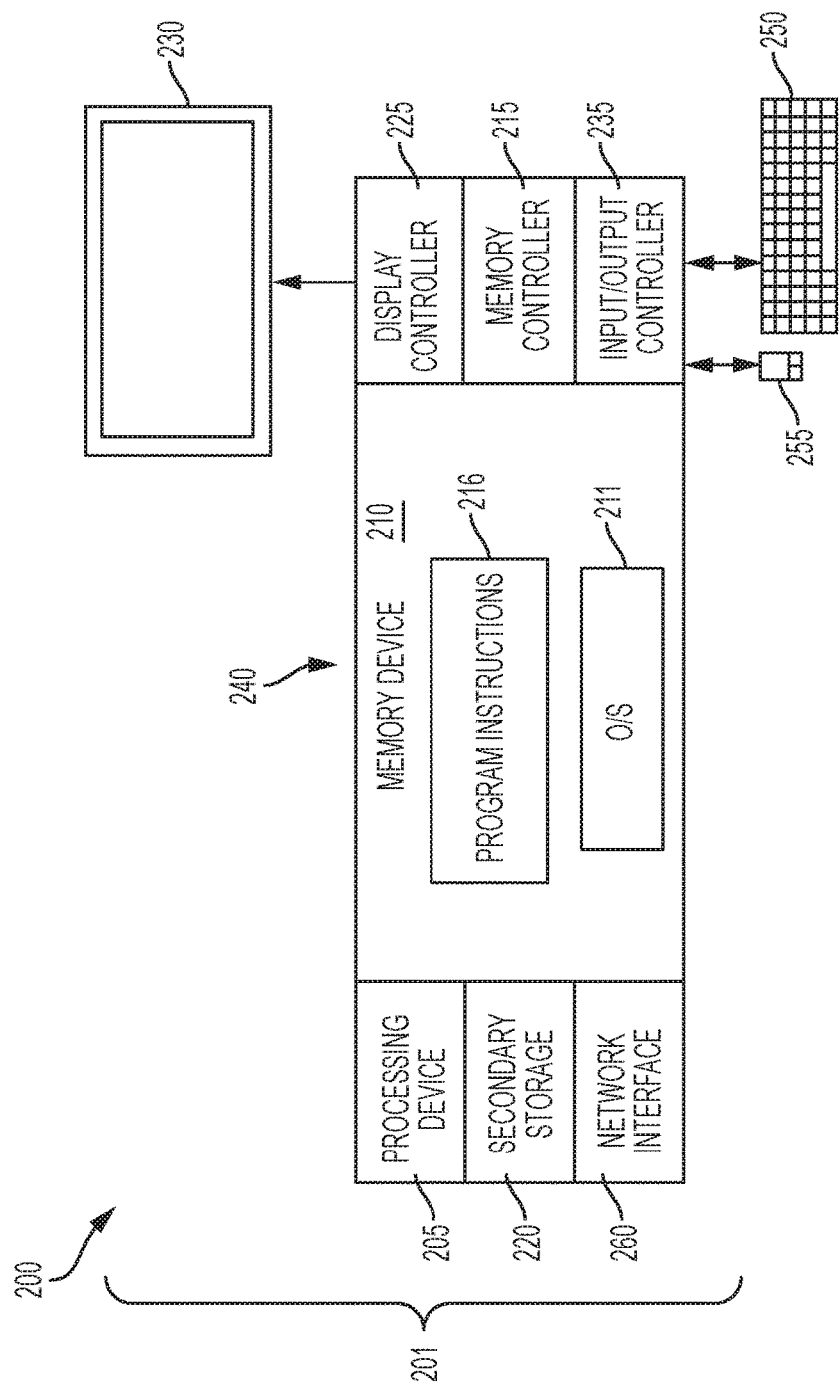
FIG. 2 depicts a block diagram of a system according to some embodiments of the present invention.

FIG. 2 depicts a block diagram of a system 200 according to an embodiment. The system 200 is depicted embodied in a computer 201 in FIG. 2. The system 200 is an example of one of the server systems 102, user systems 106, database server 118, or system management server 124 of FIG. 1.

In an exemplary embodiment, in terms of hardware architecture, as shown in FIG. 2, the computer 201 includes a processing device 205 and a memory device 210 coupled to a memory controller 215 and an input/output controller 235. The input/output controller 235 may comprise, for example, one or more buses or other wired or wireless connections, as is known in the art. The input/output controller 235 may have additional elements, which are omitted for simplicity, such as controllers, buffers (caches), drivers, repeaters, and receivers, to enable communications. Further, the computer 201 may include address, control, and/or data connections to enable appropriate communications among the aforementioned components.

In an exemplary embodiment, a keyboard 250 and mouse 255 or similar devices can be coupled to the input/output controller 235. Alternatively, input may be received via a touch-sensitive or motion sensitive interface (not depicted). The computer 201 can further include a display controller 225 coupled to a display 230.

The processing device 205 comprises a hardware device for executing software, particularly software stored in secondary storage 220 or memory device 210. The processing device 205 may comprise any custom made or commercially available computer processor, a central processing unit (CPU), an auxiliary processor among several processors associated with the computer 201, a semiconductor-based microprocessor (in the form of a microchip or chip set), a macro-processor, or generally any device for executing instructions.

The memory device 210 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), flash memory, programmable read only memory (PROM), tape, compact disk read only memory (CD-ROM), flash drive, disk, hard disk drive, diskette, cartridge, cassette or the like, etc.). Moreover, the memory device 210 may incorporate electronic, magnetic, optical, and/or other types of storage media. Accordingly, the memory device 210 is an example of a tangible computer readable storage medium 240 upon which instructions executable by the processing device 205 may be embodied as a computer program product. The memory device 210 can have a distributed architecture, where various components are situated remote from one another, but can be accessed by one or more instances of the processing device 205.

The instructions in memory device 210 may include one or more separate programs, each of which comprises an ordered listing of executable instructions for implementing logical functions. In the example of FIG. 2, the instructions in the memory device 210 include a suitable operating system (OS) 211 and program instructions 216. The operating system 211 essentially controls the execution of other computer programs and provides scheduling, input-output control, file and data management, memory management, and communication control and related services. When the computer 201 is in operation, the processing device 205 is configured to execute instructions stored within the memory device 210, to communicate data to and from the memory device 210, and to generally control operations of the computer 201 pursuant to the instructions. Examples of program instructions 216 can include instructions to implement the workload managers 108A-108E, applications 110A-110E, database manager 120, and/or applications 126 of FIG. 1.

The computer 201 of FIG. 2 also includes a network interface 260 that can establish communication channels with one or more other computer systems via one or more network links of the network 104 of FIG. 1. The network interface 260 can support wired and/or wireless communication protocols known in the art. For example, when embodied in the system management server 124 of FIG. 1, the network interface 260 can establish communication channels with at least one of the server systems 102 of FIG. 1 and the database server 118 of FIG. 1 via the network 104 of FIG. 1.

Figure 3:
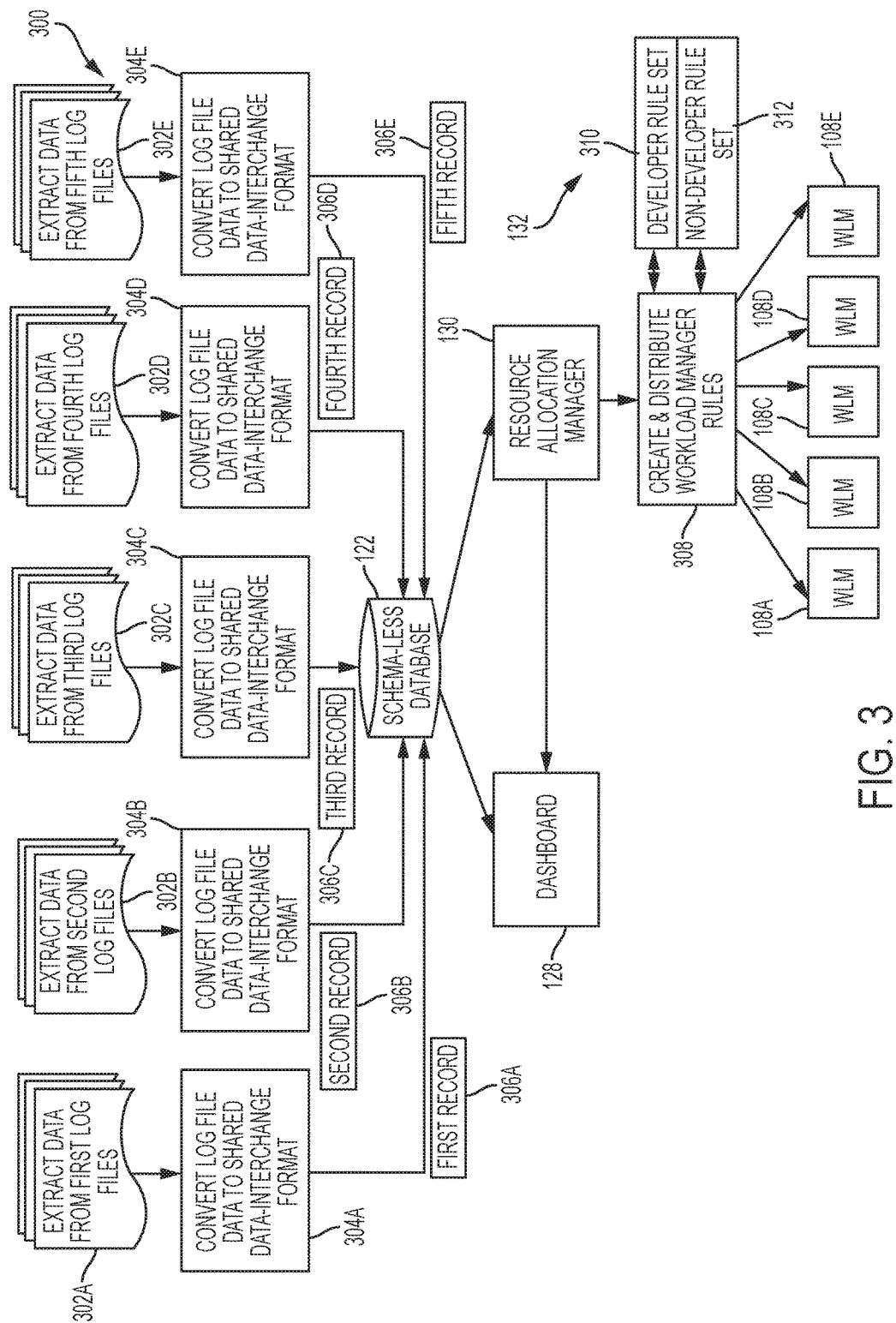
FIG. 3 depicts a data flow according to some embodiments of the present invention.

FIG. 3 depicts an example of a data flow 300 according to an embodiment and is described in reference to FIGS. 1-3. The resource allocation manager 130, or another application, can initiate data extraction 302A from the first log files 114A and conversion of log file data to a shared data-interchange format 304A as a first record 306A collected in schema-less database 122. Similarly, the resource allocation manager 130, or another application, can initiate data extraction 302B from the second log files 114B and conversion of log file data to a shared data-interchange format 304B as a second record 306B collected in schema-less database 122. The resource allocation manager 130, or another application, can also initiate data extraction 302C from the third log files 114C and conversion of log file data to a shared data-interchange format 304C as a third record 306C collected in schema-less database 122. The resource allocation manager 130, or another application, can initiate data extraction 302D from the fourth log files 114D and conversion of log file data to a shared data-interchange format 304D as a fourth record 306D collected in schema-less database 122. The resource allocation manager 130, or another application, can also initiate data extraction 302E from the fifth log files 114E and conversion of log file data to a shared data-interchange format 304E as a fifth record 306E collected in schema-less database 122. The conversion of log file data to shared data-interchange formats 304A-304E are examples of normalization processes to support conversion of various log file formats that may be in proprietary formats into a shared format even though variations in record formatting can exist between various operating systems and versions.

The conversion of log file data can include adjusting one or more of: a field size, a field delimiter, a data format, and a data type of extracted data. Field sizes can vary depending on whether numerical, character, or string data are held in various fields. Field delimiters, such as commas, semicolons, colons, periods, tags, and the like, can be supported. Data types, such as numerical data, text data, time/date data, and other data types, can be supported. Data in a binary format and/or object specific formats can be converted to a shared data-interchange format based on knowledge of the underlying operating systems used by various server systems 102A-102E of FIG. 1. Operating system type and version information can also be captured within the log files 114A-114E. Examples of data within the first record 306A and the second record 306B can be seen in the examples of extracted log file data 1300 and 1400 of FIGS. 13 and 14, respectively.

In the example of FIGS. 13 and 14, the extracted log file data 1300 and 1400 illustrate differences in log file formats that may appear between different release versions of the same underlying operating system used by different server systems 102. Further, the differences between different versions can be observed over time as a same server system 102 is upgraded from an older operating system version to a newer operating system version. As can be seen in FIGS. 13 and 14, a number of fields with associated data values are the same between extracted log file data 1300 and 1400. For example, a beginning portion 1302 of extracted log file data 1300 and a beginning portion 1402 of extracted log file data 1400 both include fields, such as an id, a server name, a date, a time, an operating system, processes, CPUs, and user information. The date and time fields in the beginning portions 1302, 1402 can be used to time synchronize data collected at different servers. The operating system information captured in the beginning portions 1302, 1402 can be used to interpret the remaining data captured in the extracted log file data 1300 and 1400 having known log file formatting specific to each operating system. Here, extracted log file data 1300 is in a newer format (i.e., associated with operating system version 6) versus extracted log file data 1400 (i.e., associated with operating system version 5). Extracted log file data 1300 includes a plurality of new fields 1304 that do not appear in extracted log file data 1400. Similarly, extracted log file data 1400 includes a plurality of old fields 1404 that do not appear in the extracted log file data 1300. Extracted log file data 1300 and 1400 include respective end portions 1306 and 1406 that have a same field format (e.g., including five common fields). Even though there are substantial field formatting differences and record size differences between records formed from the extracted log file data 1300 and 1400, the first record 306A of FIG. 3 capturing the extracted log file data 1300 and the second record 306B of FIG. 3 capturing the extracted log file data 1400 can co-exist as separate rows of records in the schema-less database 122 of FIG. 3.

With reference to FIG. 3, the dashboard 128 and the resource allocation manager 130 can access the schema-less database 122 to analyze resource allocation records from across the server systems 102 for interactive display and/or create and distribute 308 workload manager rules 132 to workload managers 108A-108E. The workload manager rules 132 can include separate rules for developers and non-developers as defined in a developer rule set 310 and a non-developer rule set 312. Developers may have a greater allocation of processing and memory resources than non-developers. However, developers may be restricted at anticipated peak load times based on predetermined limits and/or observed system performance constraints. Further, a user identifier can be a developer user type for some resources but also be a non-developer user type for other resources. In some embodiments, classification of user accounts as a developer versus non-developer can be scheduled in advance and/or transition after a predetermined time elapses or an event occurs. For example, a user may be assigned as a developer user type with extended processing and memory resource permissions for a three-month or six-month period of time and then transition to a non-developer user type for the resources. The resource allocation manager 130 may constrain the number of user accounts that can be assigned as a developer user type for a period of time to reduce the risk of excessive resource consumption and/or reduction of system performance below service level agreement thresholds within the system 100.

Figure 4:
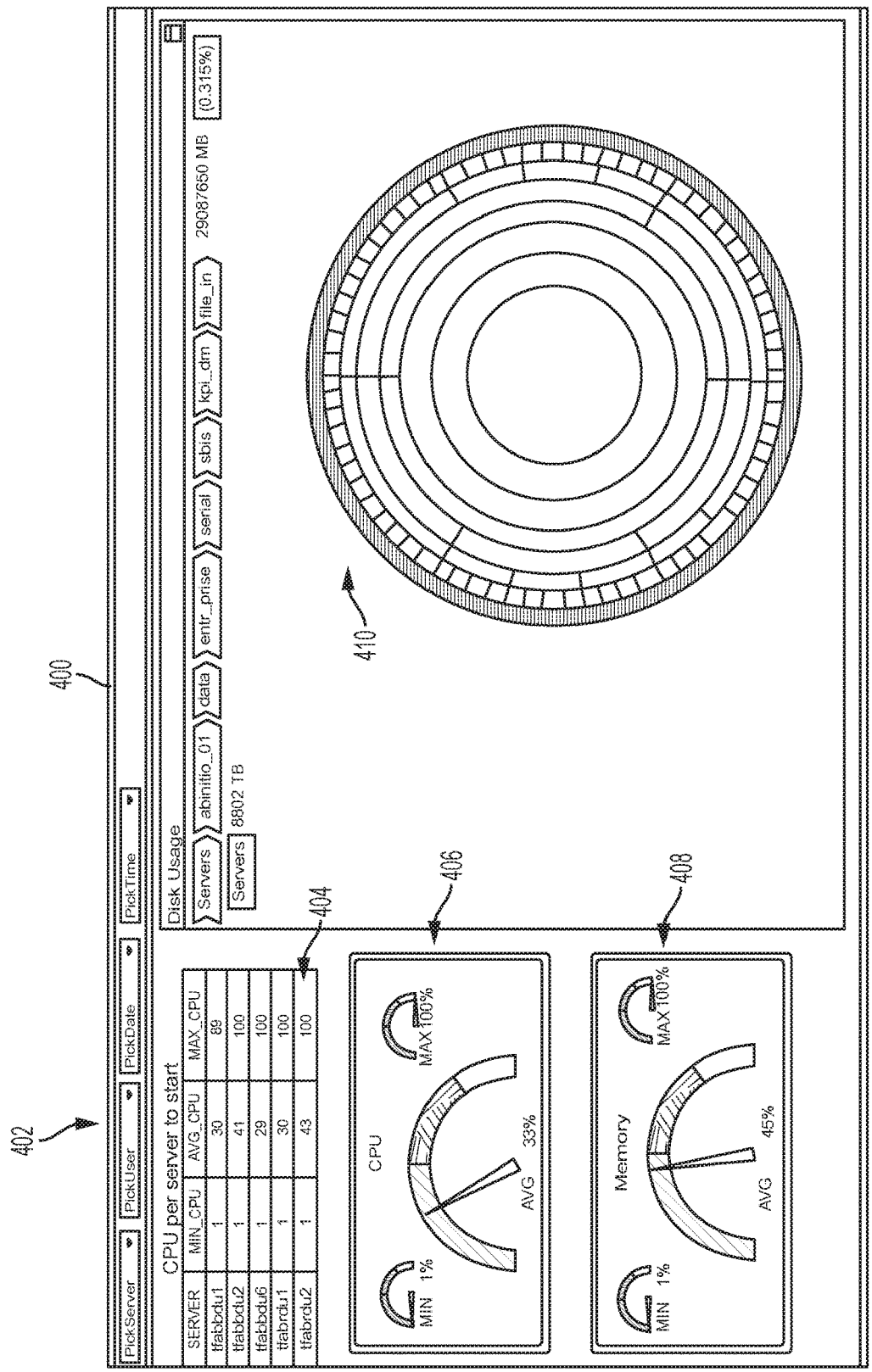
FIG. 4 depicts a resource monitor display of a dashboard according to some embodiments of the present invention.

FIG. 4 depicts an example of a resource monitor display 400 of the dashboard 128 of FIG. 1. The resource monitor display 400 can interactively depict various resource usage history data of the server systems 102 of FIG. 1 as captured in the schema-less database 122 of FIG. 1 based on the log files 114A-114E of FIG. 1. Selectable parameters 402, such as targeting a particular server, user, date, time, and/or other options, can be used to query the schema-less database 122 and summarize resulting data, such as CPU per server to start 404, CPU utilization 406, memory utilization 408, and/or disk usage 410. The resource monitor display 400 can also select groups of users for collective analysis, for instance, users assigned to a particular project or members of a particular department, to further enhance usage pattern understanding and observe trends to make predictive resource allocation updates.

Figure 5:
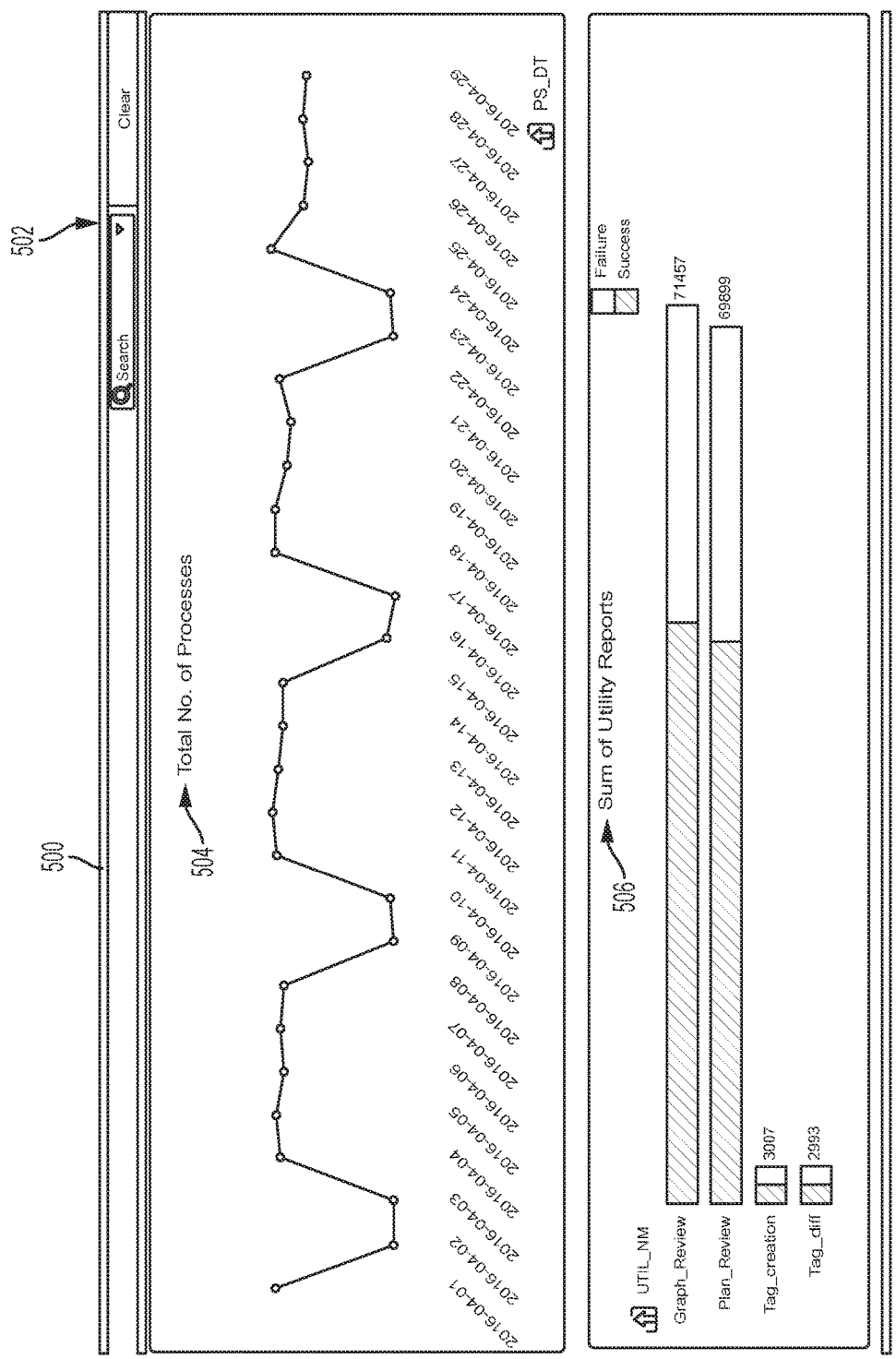
FIG. 5 depicts a process monitor and a utility summary display of a dashboard according to some embodiments of the present invention.

FIG. 5 depicts an example of a process monitor and utility summary display 500 of the dashboard 128 of FIG. 1. The process monitor and utility summary display 500 may be displayed in conjunction with the resource monitor display 400 of FIG. 4. As such, changes to selectable parameters 402 of FIG. 4 may trigger corresponding updates to the process monitor and utility summary display 500. A search control 502 can also or alternatively be used to search for specific events or records to display on the resource monitor display 400 and/or the process monitor and utility summary display 500. The process monitor and utility summary display 500 can include a process trend plot 504 that indicates a history of active processes over a period of time. The process monitor and utility summary display 500 can also include a utility report summary 506 that can visually depict levels of success and failures for a number of operations within a time period selected and for resources selected through the selectable parameters 402 of FIG. 4, for example.

Figure 6:
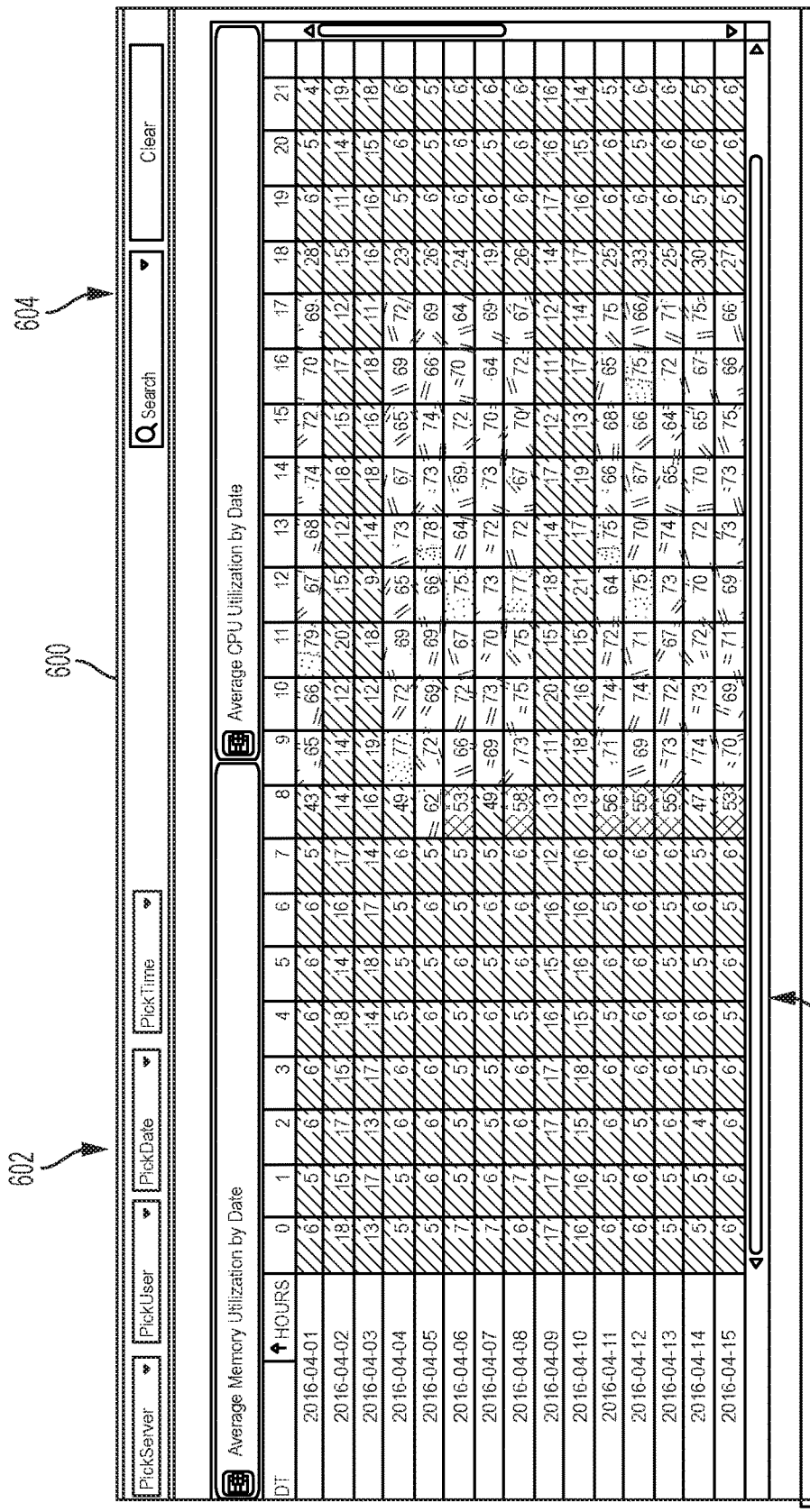
FIG. 6 depicts a utilization heat map of a dashboard according to some embodiments of the present invention.

FIG. 6 depicts an example of a utilization heat map 600 of the dashboard 128 of FIG. 1. The utilization heat map 600 can be visible with or viewed separately from the resource monitor display 400 and/or the process monitor and utility summary display 500 of FIGS. 4 and 5. The utilization heat map 600 can include selectable parameters 602 and/or a search control 604. The utilization heat map 600 may use color coding or other visual indications to identify how close resource utilization 606 is to one or more resource limits at each time interval over a selected date/time range. The dashboard 128 of FIG. 1 can adjust a display parameter of one or more values that exceed one or more resource limits on one or more visual depictions (e.g., green<50%, yellow 51% to 59%, orange 60% to 74%, red>=75%). The utilization heat map 600 can be selectable to display average memory and/or processing resource utilization across discrete time intervals that may be user configurable/adjustable.

Further utilization details may be depicted in combination with or separately from the utilization heat map 600, including a user-level memory resource usage summary 700 as depicted in FIG. 7 and/or a user-level processor resource usage summary 800 as depicted in FIG. 8. The user-level memory resource usage summary 700 and user-level processor resource usage summary 800 can illustrate a list of users under analysis along with specific usage at one or more selected cells of the resource utilization 606.

Figure 9:
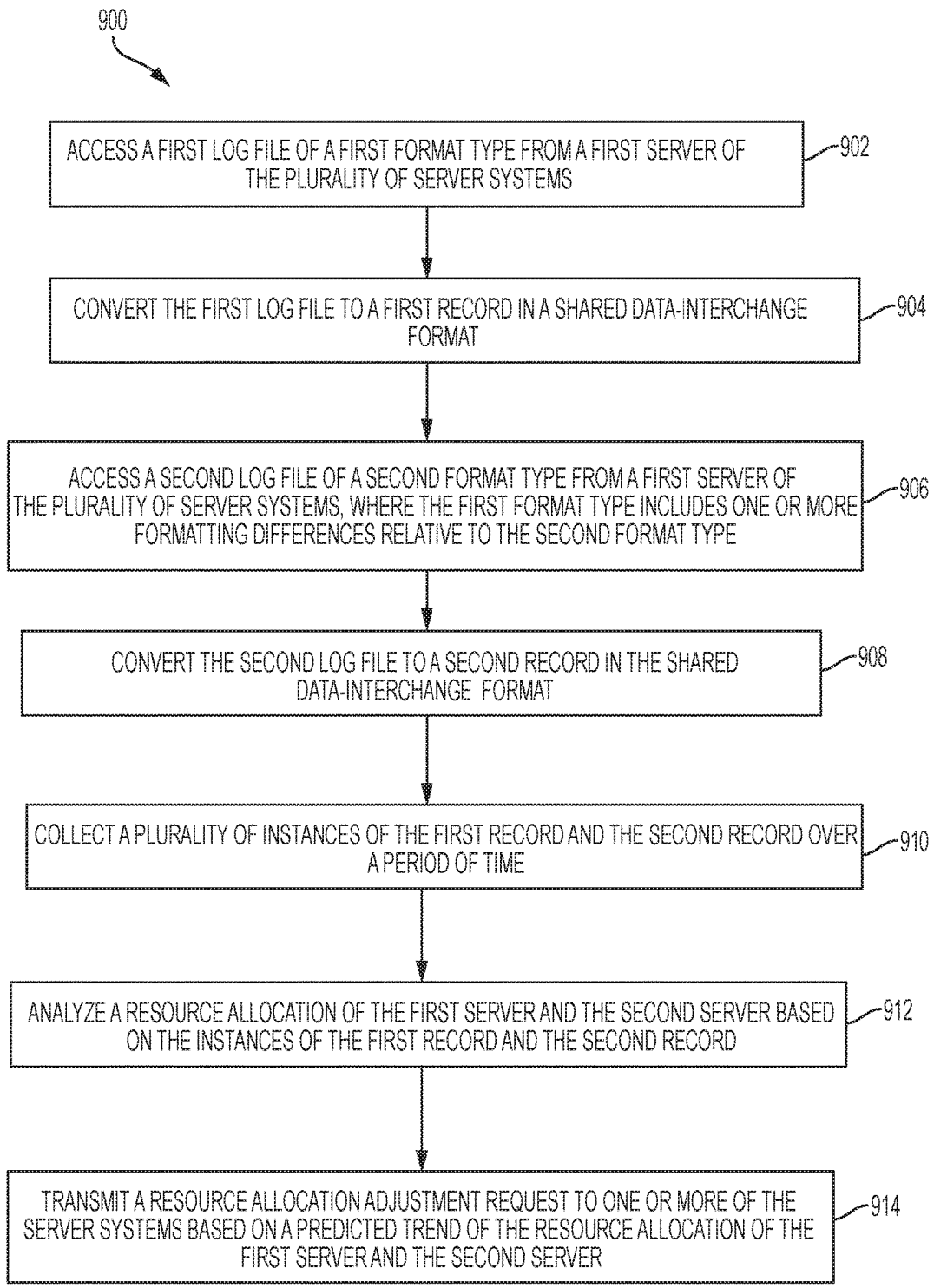
FIG. 9 depicts a process flow according to some embodiments of the present invention.

Turning now to FIG. 9, a process flow 900 is depicted according to an embodiment. The process flow 900 includes a number of steps that may be performed in the depicted sequence or in an alternate sequence. The process flow 900 may be performed by the system 100 of FIG. 1. In one embodiment, the process flow 900 is performed by the system management server 124 of FIG. 1 in combination with the server systems 102 and database server 118. Although the example of process flow 900 is described in reference to first and second servers 102A and 102B, the process flow 900 applies to any combination of the servers 102A-102E as well as one or more additional servers (not depicted). The process flow 900 is described in reference to FIGS. 1-9.

At step 902, a first log file 114A of a first format type is accessed from a first server 102A of the plurality of server systems 102. For example, the resource allocation manager 130, or another application, can initiate data extraction 302A from the first log files 114A. At step 904, the first log file 114A is converted to a first record 306A in a shared data-interchange format 304A.

At step 906, a second log file 114B of a second format type is accessed from a second server 102B of the plurality of server systems 102, where the first format type includes one or more formatting differences relative to the second format type. For example, the resource allocation manager 130, or another application, can initiate data extraction 302B from the second log files 114B with one or more formatting variations existing between the first log files 114A and the second log files 114B.

At step 908, the second log file 114B is converted to a second record 306B in the shared data-interchange format 304B. Converting the first log file 114A and the second log file 114B in the shared data-interchange format 304A, 304B can include adjusting one or more of: a field size, a field delimiter, a data format, and a data type.

At step 910, instances of the first record 306A and the second record 306B are collected over a period of time. Collecting the plurality of instances of the first record 306A and the second record 306B can include storing the instances of the first record 306A and the second record 306B in at least one schema-less database 122.

At step 912, a resource allocation of the first server 102A and the second server 102B is analyzed based on the instances of the first record 306A and the second record 306B. Analyzing the resource allocation of the first server 102A and the second server 102B can include determining one or more historical utilization trends over two or more time intervals having different durations.

At step 914, a resource allocation adjustment request is transmitted to one or more of the server systems 102 based on a predicted trend of the resource allocation of the first server 102A and the second server 102B. Predicted trends can be based on identified and extrapolated patterns (e.g., cyclical demand variations, rate of change analysis, scheduled events, and the like). Resource allocation adjustment requests can target specific workload managers 108A-108E to request increases or decreases of processor resources and memory resources (including disk resources). Allocation adjustments of step 914 of FIG. 9 can be localized to a subset of the server systems 102 and may be specific to precise users or more broadly applied to particular user types as further illustrated in the example of FIG. 10.

Figure 10:
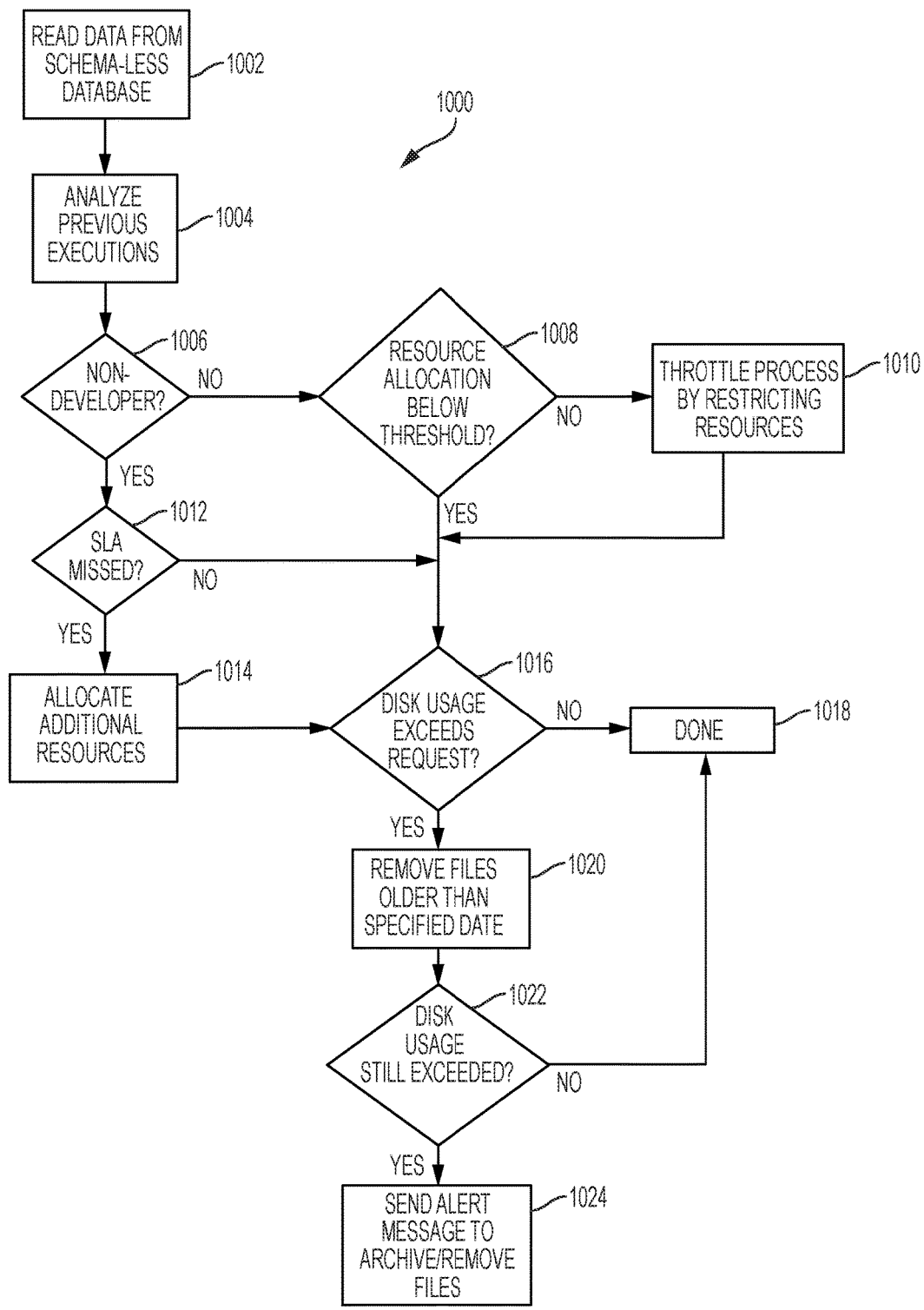
FIG. 10 depicts a process flow according to some embodiments of the present invention.

Turning now to FIG. 10, a process flow 1000 is depicted according to an embodiment. The process flow 1000 includes a number of steps that may be performed in the depicted sequence or in an alternate sequence. The process flow 1000 may be performed by the system 100 of FIG. 1. In one embodiment, the process flow 1000 is performed by the system management server 124 of FIG. 1 in combination with the server systems 102 and database server 118. The process flow 1000 can expand upon the process flow 900 of FIG. 9. The process flow 1000 is described in reference to FIGS. 1-10.

At step 1002, the resource allocation manager 130 can read data from schema-less database 122 and analyze previous executions at step 1004. The resource allocation manager 130 can determine a user type identifier associated with a workload history of a resource allocation. The resource allocation manager 130 can apply a developer rule set 310 to determine a resource allocation adjustment based on determining that the user type identifier is a developer user type. For example, at step 1006, the resource allocation manager 130 can determine whether the user type identifier is a non-developer or a developer. If the user type identifier for a user indicates that the user is not a non-developer at step 1006 (i.e., the user is a developer), then the developer rule set 310 can be applied to determine whether the user of the developer user type has exceeded a developer resource allocation limit at step 1008. If the user of the developer user type has exceeded the developer resource allocation limit (i.e., resource allocation is not below a threshold of the developer resource allocation limit), throttling one or more processes of the user is performed at step 1010 to restrict the resource allocation in the resource allocation adjustment based on exceeding the developer resource allocation limit; otherwise, step 1016 is performed if the resource allocation is below the threshold of the developer resource allocation limit.

If the user type identifier for a user indicates that the user is a non-developer at step 1006, then the resource allocation manager 130 can apply the non-developer rule set 312 to determine the resource allocation adjustment based on determining that the user type identifier is a non-developer user type. The non-developer rule set 312 can include determining whether a user of the non-developer user type has experienced system response times beyond a responsiveness threshold at step 1012 (e.g., a service level agreement is missed), and allocating additional resources in the resource allocation adjustment for the user at step 1014 based on the system response times exceeding the responsiveness threshold. If the user of the developer user type has not exceeded a developer resource allocation limit at step 1008, throttling at step 1010 is complete, or a user of the non-developer user type has not experienced system response times beyond a responsiveness threshold at step 1012, then step 1016 may be performed, as described below.

The resource allocation manager 130 can apply the workload manager rules 132 to remove one or more files older than a specified date at step 1020 based on determining that more disk resources have been used than were requested in a disk allocation request at step 1016. At step 1024, an alert message can be triggered based on determining that a disk resource usage exceeds the disk allocation request at step 1022 after removing the one or more files older than a specified date at step 1020. The alert may indicate that manual steps are needed to archive and/or otherwise remove files. If the disk usage does not exceed the request at step 1016 or the disk usage does not still exceed the request at step 1022, then process flow 1000 is done at step 1018.

Figure 11:
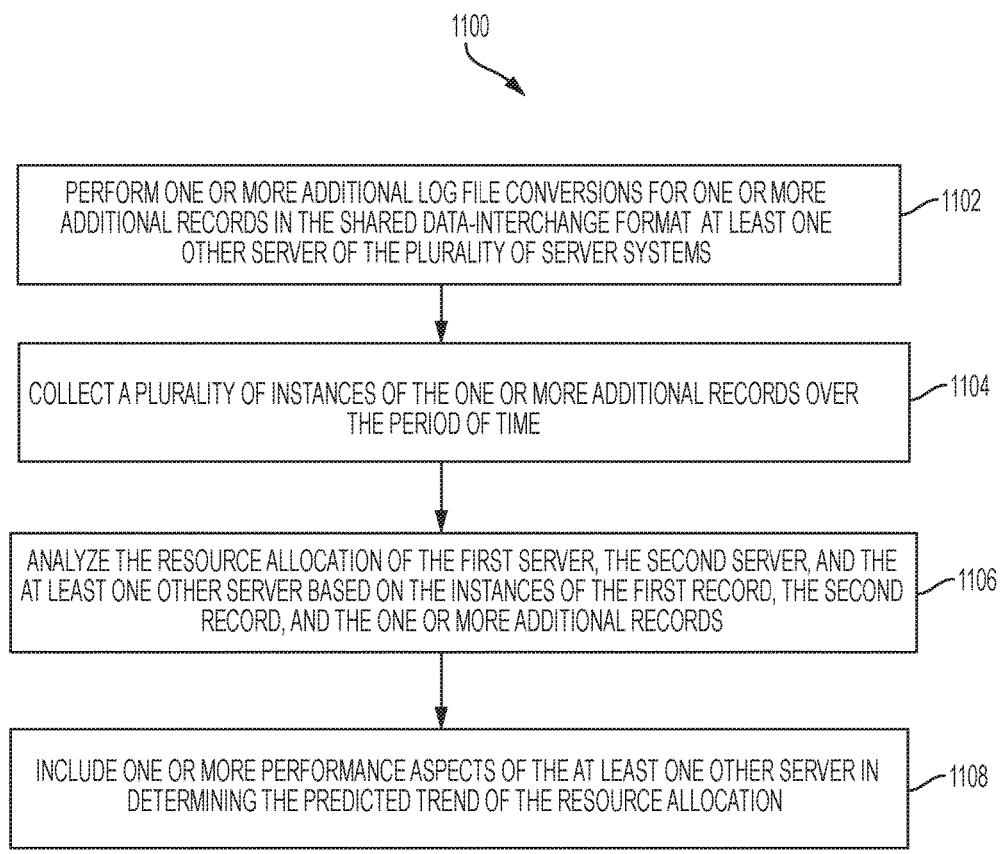
FIG. 11 depicts a process flow according to some embodiments of the present invention.

Turning now to FIG. 11, a process flow 1100 is depicted according to an embodiment. The process flow 1100 includes a number of steps that may be performed in the depicted sequence or in an alternate sequence. The process flow 1100 may be performed by the system 100 of FIG. 1. In one embodiment, the process flow 1100 is performed by the system management server 124 of FIG. 1 in combination with the server systems 102 and database server 118. The process flow 1100 can expand upon the process flow 900 of FIG. 9. The process flow 1100 is described in reference to FIGS. 1-11.

At block 1102, the resource allocation manager 130 can perform one or more additional log file conversions for one or more additional records 306C-306E in the shared data-interchange format 304C-E from at least one other server 102C-102E of the plurality of server systems 102. At block 1104, a plurality of instances of the one or more additional records 306C-306E can be collected over a period of time, for instance, written to the schema-less database 122.

At block 1106, the resource allocation manager 130 can analyze the resource allocation of the first server 102A, the second server 102B, and the at least one other server 102C-102E based on the instances of the first record 306A, the second record 306B, and the one or more additional records 306C-306E. At block 1108, the resource allocation manager 130 can include one or more performance aspects of the at least one other server 102C-102E in determining the predicted trend of the resource allocation. For example, trends can be considered for groups of processes across multiple servers 102C-102E to consider collective allocation impacts on processing, memory, and network resources.

Figure 12:
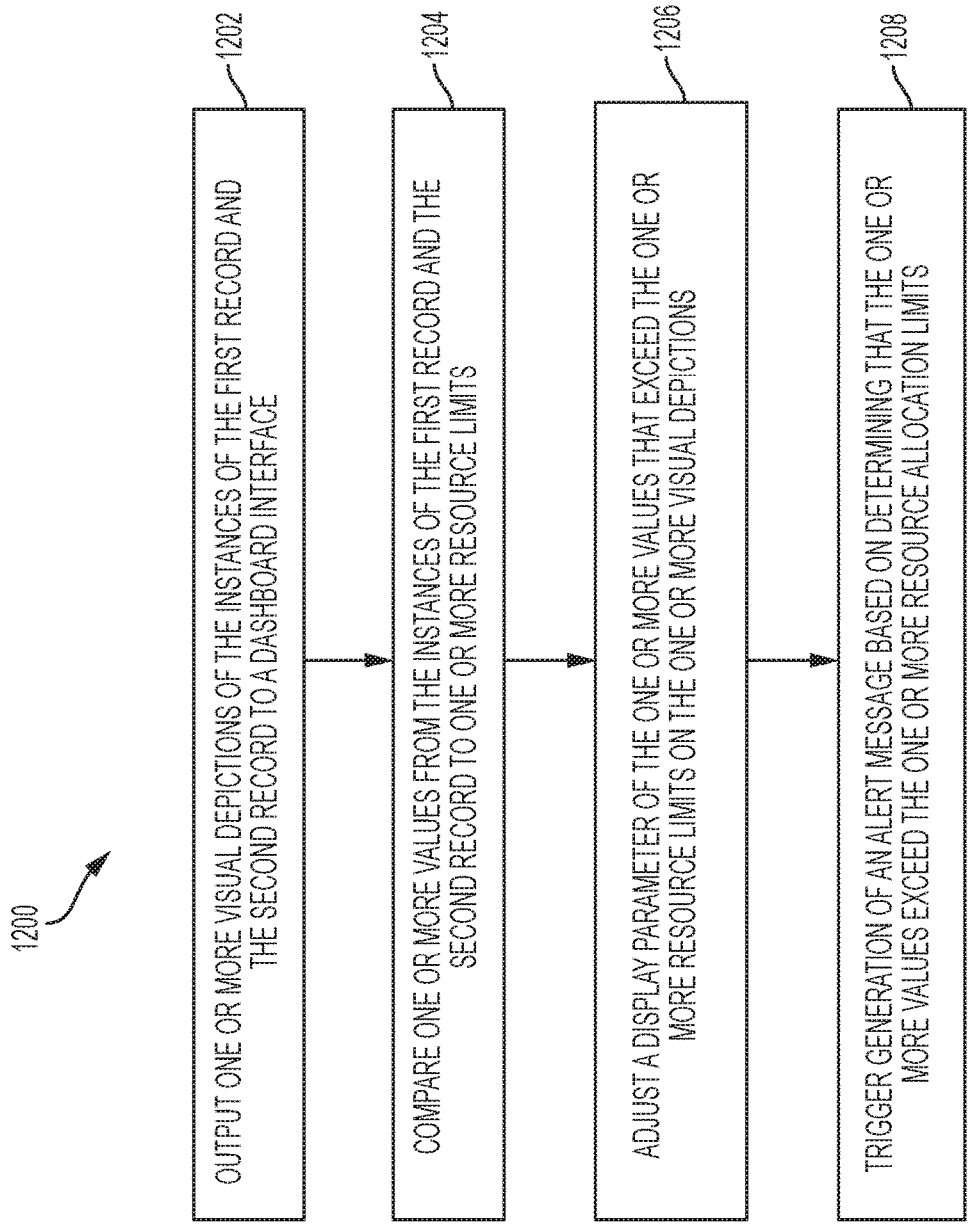
FIG. 12 depicts a process flow according to some embodiments of the present invention.

Turning now to FIG. 12, a process flow 1200 is depicted according to an embodiment. The process flow 1200 includes a number of steps that may be performed in the depicted sequence or in an alternate sequence. The process flow 1200 may be performed by the system 100 of FIG. 1. In one embodiment, the process flow 1200 is performed by the system management server 124 of FIG. 1 in combination with the server systems 102 and database server 118. The process flow 1200 can expand upon the process flow 900 of FIG. 9. The process flow 1200 is described in reference to FIGS. 1-12.

At block 1202, the system management server 124 can output one or more visual depictions of the instances of the first record 306A and the second record 306B to a dashboard interface of the dashboard 128, for instance, as depicted in the examples of FIGS. 4-8. The dashboard interface of dashboard 128 can depict a plurality of resource utilization metrics including: a minimum resource utilization, an average resource utilization, and a maximum resource utilization. The resource utilization metrics can be subdivided into a plurality of processing resource utilization metrics and memory resource utilization metrics. The memory resource utilization metrics can be further subdivided into a plurality of main memory resource utilization metrics and disk resource utilization metrics. The resource utilization metrics can be tracked based on a number of active processes and/or a user identifier. A timescale of the resource utilization metrics can be user adjustable. The dashboard 128 can display an average of two or more values from the instances of the first record 306A and the second record 306B to align with the timescale.

At block 1204, the system management server 124 can compare one or more values from the instances of the first record 306A and the second record 306B to one or more resource limits. At block 1206, the system management server 124 can adjust a display parameter of one or more values that exceed the one or more resource limits on one or more visual depictions. At block 1208, the system management server 124 can trigger generation of an alert message based on determining that the one or more values exceed the one or more resource allocation limits. The alert message can be in the form of an e-mail, an instant message, a text message, or other formats known in the art.

Technical effects include increasing processor and memory system allocation efficiency predictively according to one or more predicted trends of resource allocation and/or utilization.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may comprise a computer readable signal medium or a computer readable storage medium. A computer readable storage medium may comprise, for example, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In one aspect, the computer readable storage medium may comprise a tangible medium containing or storing a program for use by or in connection with an instruction execution system, apparatus, and/or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may comprise any computer readable medium that is not a computer readable storage medium and that can communicate, propagate, and/or transport a program for use by or in connection with an instruction execution system, apparatus, and/or device.

The computer readable medium may contain program code embodied thereon, which may be transmitted using any appropriate medium, including, but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server.

It will be appreciated that aspects of the present invention are described herein with reference to flowchart illustrations and/or block diagrams of methods, apparatus (systems) and computer program products, according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

What is claimed is:

1. A system, comprising:
   a network interface operable to communicate with a plurality of server systems over a network;
   a processing device; and
   a memory device in communication with the processing device, the memory device storing instructions that when executed by the processing device result in:
   accessing a first log file of a first format type from a first server of the plurality of server systems;
   converting the first log file to a first record in a shared data-interchange format;

accessing a second log file of a second format type from a second server of the plurality of server systems, wherein the first format type comprises one or more formatting differences relative to the second format type;

converting the second log file to a second record in the shared data-interchange format;

collecting a plurality of instances of the first record and the second record over a period of time;

analyzing a resource allocation of the first server and the second server based on the instances of the first record and the second record;

determining a user type identifier associated with a workload history of the resource allocation;

applying a developer rule set to determine a resource allocation adjustment based on determining that the user type identifier is a developer user type;

applying a non-developer rule set to determine the resource allocation adjustment based on determining that the user type identifier is a non-developer user type; and transmitting a request for the resource allocation adjustment to one or more of the server systems based on a predicted trend of the resource allocation of the first server and the second server.

2. The system of claim 1, wherein collecting the plurality of instances of the first record and the second record comprises storing the instances of the first record and the second record in at least one schema-less database.

3. The system of claim 1, wherein converting the first log file and the second log file in the shared data-interchange format comprises adjusting one or more of: a field size, a field delimiter, a data format, and a data type.

4. The system of claim 1, wherein analyzing the resource allocation of the first server and the second server comprises determining one or more historical utilization trends over two or more time intervals having different durations.

5. The system of claim 1, wherein applying the developer rule set comprises:

determining whether a user of the developer user type has exceeded a developer resource allocation limit; and throttling one or more processes of the user to restrict the resource allocation in the resource allocation adjustment based on exceeding the developer resource allocation limit.

6. The system of claim 1, wherein applying the non-developer rule set comprises:

determining whether a user of the non-developer user type has experienced system response times beyond a responsiveness threshold; and allocating additional resources in the resource allocation adjustment for the user based on the system response times exceeding the responsiveness threshold.

7. The system of claim 1, further comprising instructions that when executed by the processing device result in:

removing one or more files older than a specified date based on determining that more disk resources have been used than were requested in a disk allocation request; and triggering an alert message based on determining that a disk resource usage exceeds the disk allocation request after removing the one or more files older than a specified date.

8. The system of claim 1, further comprising instructions that when executed by the processing device result in:

performing one or more additional log file conversions for one or more additional records in the shared data-interchange format from at least one other server of the plurality of server systems;

collecting a plurality of instances of the one or more additional records over the period of time;

analyzing the resource allocation of the first server, the second server, and the at least one other server based on the instances of the first record, the second record, and the one or more additional records; and including one or more performance aspects of the at least one other server in determining the predicted trend of the resource allocation.

9. The system of claim 1, further comprising instructions that when executed by the processing device result in:

outputting one or more visual depictions of the instances of the first record and the second record to a dashboard interface.

10. The system of claim 9, wherein the dashboard interface depicts a plurality of resource utilization metrics comprising: a minimum resource utilization, an average resource utilization, and a maximum resource utilization.

11. The system of claim 10, wherein the resource utilization metrics are subdivided into a plurality of processing resource utilization metrics and memory resource utilization metrics.

12. The system of claim 11, wherein the memory resource utilization metrics are further subdivided into a plurality of main memory resource utilization metrics and disk resource utilization metrics.

13. The system of claim 10, wherein the resource utilization metrics are tracked based on a number of active processes.

14. The system of claim 10, wherein the resource utilization metrics are tracked based on a user identifier.

15. The system of claim 10, wherein a timescale of the resource utilization metrics is user adjustable.

16. The system of claim 15, further comprising instructions that when executed by the processing device result in:

averaging two or more values from the instances of the first record and the second record to align with the timescale.

17. The system of claim 9, further comprising instructions that when executed by the processing device result in:

comparing one or more values from the instances of the first record and the second record to one or more resource limits; and adjusting a display parameter of the one or more values that exceed the one or more resource limits on the one or more visual depictions.

18. The system of claim 17, further comprising instructions that when executed by the processing device result in:

triggering generation of an alert message based on determining that the one or more values exceed the one or more resource allocation limits.

19. A computer program product comprising a non-transitory storage medium embodied with computer program instructions that when executed by a computer cause the computer to implement:

accessing a first log file of a first format type from a first server of the plurality of server systems;

converting the first log file to a first record in a shared data-interchange format;

accessing a second log file of a second format type from a second server of the plurality of server systems, wherein the first format type comprises one or more formatting differences relative to the second format type;

converting the second log file to a second record in the shared data-interchange format;
collecting a plurality of instances of the first record and the second record over a period of time;
analyzing a resource allocation of the first server and the second server based on the instances of the first record and the second record;
determining a user type identifier associated with a workload history of the resource allocation;
applying a developer rule set to determine a resource allocation adjustment based on determining that the user type identifier is a developer user type;
applying a non-developer rule set to determine the resource allocation adjustment based on determining that the user type identifier is a non-developer user type; and
transmitting a request for the resource allocation adjustment to one or more of the server systems based on a predicted trend of the resource allocation of the first server and the second server.

20. The computer program product of claim 19, wherein collecting the plurality of instances of the first record and the second record comprises storing the instances of the first record and the second record in at least one schema-less database.

21. The computer program product of claim 19, wherein analyzing the resource allocation of the first server and the second server comprises determining one or more historical utilization trends over two or more time intervals having different durations.

22. The computer program product of claim 19, wherein applying the developer rule set comprises determining whether a user of the developer user type has exceeded a developer resource allocation limit, and throttling one or more processes of the user to restrict the resource allocation in the resource allocation adjustment based on exceeding the developer resource allocation limit, and further wherein applying the non-developer rule set comprises determining whether a user of the non-developer user type has experienced system response times beyond a responsiveness threshold, and allocating additional resources in the resource allocation adjustment for the user based on the system response times exceeding the responsiveness threshold.

23. The computer program product of claim 19, further comprising computer program instructions that when executed by the computer cause the computer to implement:
performing one or more additional log file conversions for one or more additional records in the shared data-interchange format from at least one other server of the plurality of server systems;
collecting a plurality of instances of the one or more additional records over the period of time;
analyzing the resource allocation of the first server, the second server, and the at least one other server based on the instances of the first record, the second record, and the one or more additional records; and
including one or more performance aspects of the at least one other server in determining the predicted trend of the resource allocation.

* * * * *